Patented Apr. 24, 1945

2,374,503

UNITED STATES PATENT OFFICE 2,374,503

PRODUCTION OF RIBOFLAVIN BY BIOCHEMICAL METHODS

Frank J. Rudert, Terre Haute, Ind., assignor to Commercial Solvents Corporation, Terre Haute, Ind., a corporation of Maryland No Drawing. Application November 12, 1942, Serial No. 465,383

15 Claims. (Cl. 195—28)

The present invention relates to a process for the biochemical synthesis of riboflavin. More particularly, it is concerned with the production of riboflavin by the action of a fungus, known as *Eremothecium ashbyii*, on a novel type of mash.

The above-mentioned organism previously has been employed in the synthesis of riboflavin from solid media, containing carbohydrate and protein. These media contained glucose as the carbohydrate, and peptone and beef bouillon as the protein source. The yields of riboflavin thus produced, however, were comparatively small and, in general, a period of approximately three weeks was required to secure such yields. In some instances, considerably longer periods of time were required. With liquid media, such as those of the peptone-glucose type, the yields of riboflavin were far inferior to those obtained where solid media were utilized. Recently, it has been discovered that greatly increased yields of riboflavin may be obtained by means of fermenting protein-carbohydrate containing mashes with the fungus *Eremothecium ashbyii*, while maintaining the mash in a high degree of aeration throughout the fermentation. In this process, which is described and claimed in copending application, U. S. Serial No. 434,901, filed March 16, 1942, by H. R. Stiles, the presence of a metabolizable carbohydrate together with the protein is deemed to be imperative in order that riboflavin be produced in quantities of practical significance.

It has now been discovered that the metabolizable carbohydrates, which have heretofore been regarded as an indispensable ingredient of mashes employed in the production of riboflavin by the action of the organism *Eremothecium ashbyii* thereon, can be replaced entirely by lipids, and it is to such lipid-containing mashes that the present invention is directed.

In utilizing the novel mashes of the present invention, the procedure of copending application, U. S. Serial No. 434,901, referred to above, is preferably employed. According to the method there described, a mash having a predetermined pH and possessing the desired nutrients together with the necessary mineral salts, is fermented with the fungus *Eremothecium ashbyii* under pure culture conditions. While fermentation is in progress, sterile air is introduced in a manner such that the fungus and air are substantially completely dispersed throughout the mash. In order to avoid any possible contamination from the atmosphere during the fermentation, a positive operation pressure is preferably maintained over the surface of the mash. Toward the conclusion of the fermentation, the pH will ordinarily be found to be between about 6.5 and 7.2. Recovery of the riboflavin thus synthesized, is facilitated by heating the mash; however, in view of the fact that such mash is frequently on the alkaline side, and since alkaline solutions of riboflavin are unstable to heat, the pH of the mash is adjusted to a value of around 5.5 prior to this heat treatment by the addition of the required amount of a suitable acid, such as, for example, concentrated sulfuric acid. The acidified mash is then preferably heated and held at a temperature of from about 60 to 120° C. for a period of one-half to two hours, depending upon the temperature employed, as a result of which the riboflavin remaining in the cells of the fungus is liberated. After this treatment, the mash is filtered by any convenient means, and the riboflavin present in the filtrate may be recovered therefrom, in accordance with any of several well-known methods, for example, by adsorption on a suitable adsorbent material such as fuller's earth or adsorbent clay. The resulting adsorbate can then be treated in a known manner with a suitable elution solvent as, for example, that described in U. S. Patent No. 2,175,014 of Booher et al., to obtain the riboflavin in a substantially pure state.

The nutrient mashes, fermentable by the organism *Eremothecium ashbyii*, may vary widely in composition. In addition to the nutritive amount of metabolizable lipids contained in the mashes of the present invention, and which are substituted for the carbohydrates in the mashes previously employed, there is required from about 10 to 90 per cent of protein based upon the weight of the total nutrients present in the mash, and, in this connection, the expression "proteinaceous material" as used in the present description is intended to include proteins, denatured proteins. Examples of lipids metabolizable by the organism *Eremothecium ashbyii* are corn oil, lecithin, olive oil, peanut oil, cocoa-butter, "Mazola" oil, and the like. In addition to the protein sources ordinarily employed, materials such as tankage, fish meal, meat scrap, untreated hide scrap, etc., may likewise be successfully utilized to furnish the protein required by the metabolic processes of the organism.

In general, the total nutrient content of the mash may vary from between about 0.5 to 9 per cent, depending upon the composition of the particular mash utilized. Obviously, it is desirable to employ mashes having the maximum initial concentration of nutrient substances practical under the circumstances, in order to conserve operating space and equipment. Mashes having a nutrient content appreciably in excess of 9 per cent, however, are generally not suited for satisfactory growth of the organism, and, hence, from a practical standpoint, at least, are undesirable. For most purposes, it is preferred to employ mashes having an initial nutrient content of about 3 per cent, since mashes of such concentration seem to be favorable both from the standpoint of growth of the organism and relative amounts of riboflavin produced. In regard to the nutrient content of the mash, it should be understood, however, that since the amount of nutrient present decreases as the fermentation proceeds, the nutrient content may be intermittently increased to the original value by the addition of the required nutrient substances as many times as may be found necessary or desirable under the circumstances.

Aeration of the mash during the fermentation may be accomplished by any desired means. The chief requirements being that the air employed should be sterile, and that it be introduced in quantities and in a degree of dispersion sufficient for rapid growth of the fungus. In certain instances, it may even be found desirable to employ both aeration and moderate mechanical agitation, in order to facilitate a more rapid and satisfactory growth of the organism. Frequently, it has been found that such practice results in shorter fermentation periods, and is particularly found to be true when employing relatively small volumes of mash. In the case of larger volumes of mash, however, the organism will generally be observed to grow very satisfactorily without mechanically agitating the mash provided adequate amounts of sterile air are introduced throughout the fermentation step. A convenient method for aerating comparatively large volumes of such mashes consists of introducing sterile air through a dispersion unit or a series of such units, thereby causing the air to be divided into bubbles of small diameter. Although the rate at which such aeration occurs may vary, within relatively wide limits, it has generally been found to be preferable to introduce air at a rate of from about 1.5 to 2.0 cubic feet per minute per square foot of mash surface. While the above-mentioned methods of aerating the mash has been found particularlgy efficient when employing the customary fermentation procedures, it should be understood that the term "aeration," as used in the present description as well as in the appended claims, is not to be restricted to such methods. For example, under certain circumstances ample aeration can be effected by stirring, spraying the mash in the presence of an atmosphere of sterile air, or by shaking, the latter method being illustrated in the example which appears below.

The initial pH of the mashes employed in the present invention may vary from between approximately 4.5 to 9.1, although for the majority of mashes, it is preferable to utilize an initial pH of between 5.5 and 7.5. During the final stages of the process a pH value generally lying between about 6.5 to 8.0 is reached. In connection with the factor of initial pH, it may be mentioned that if the pH value of the mash is too low for satisfactory growth of the organism, such mash may be readily adjusted to the proper value by means of the addition of a suitable alkaline material to bring the pH within the range desired for the initial stages of the fermentation. As examples of alkaline materials for this purpose, there may be mentioned sodium carbonate, calcium carbonate and the like.

In general the temperature at which fermentation may be effected can vary from 15 to 40° C. However, it has been found preferable to employ temperatures of from 20 to 34° C. At temperatures below 15° C., the fermentation rate is reduced to such an extent that only negligible amounts of riboflavin are produced, while at temperatures in excess of 40° C. the ability of the organism to produce riboflavin is greatly impaired.

The period required to carry fermentation to completion is, of course, dependent upon numerous factors such as temperature, the nutrient content of the particular mash fermented, percentage of inoculant, etc. Usually the fermentation is complete within about 50 to 90 hours, after inoculation. However, in any given instance, this time may readily be ascertained by periodic assays of mash samples for increasing riboflavin content.

The inoculant containing the fungus *Eremothecium ashbyii*, may be prepared in accordance with a number of different methods. In general, it may be said that at least one transfer from the stock to a suitable medium is required to produce an active culture. However, the number of such transfers will be found to ordinarily be dependent upon the final quantity of inoculant necessary for satisfactory fermentation of the desired volume of mash.

While the riboflavin present in the liquors, resulting from the fermentation process of the present invention, may be recovered therefrom by means of any of several standard methods some of which have been previously mentioned, a further advantage of the present invention, constitutes the fact that dried residues can be secured containing riboflavin in amounts of from between about 200 to 6000 $\mu$g. per gram of dried material, by concentrating said liquors in accordance with well-established procedures. However, care should be exercised in the concentration steps to avoid temperatures which would result in substantial destruction of the riboflavin activity of the resulting residue. Generally the residues rich in riboflavin can be secured by first concentrating the fermented mash through evaporation, such as, for example, by the use of a multiple effect evaporator, after which the resulting concentrate may be dried to a solid mass by evaporation in pans, or by the use of rotary drum driers, vacuum driers, spray driers, or the like. As an alternative method the riboflavin rich liquor may be reduced to a solid form in a single step by spraying evaporation. In general, it may be said that any of the common methods for recovering solids from liquids, which would not tend to adversely affect the riboflavin present therein, may be employed for this purpose. It will, therefore, be evident that the above-mentioned feature of the present invention is capable of numerous modifications. The only essential requirement being that the recovery step is carried out in a manner not harmful to the riboflavin contained in the resulting residue.

The present invention may be more specifically illustrated by the following example:

*Example*

In a series of experiments, various lipids and peptone or egg albumen were added to distilled water in the concentration indicated below. The mashes containing egg albumen were supplemented with a salt mixture of the following composition: 0.05% KH₂PO₄, 0.07% MgSO₄.7H₂O, 0.10% NaCl and 0.001% FeSO₄.7H₂O; however, the mashes to which peptone has been added, contained no nutrient salt mixture. The mixtures, thus obtained, were then adjusted to the definite initial pH and sterilized for about 45 minutes at 20 pounds gauge pressure, after which the mash was cooled to 30° C. and inoculated with 0.7 per cent of an active culture of *Eremothecium ashbyii*. The depth of the mash in the fermentation vessel was one-half inch, an atmosphere of sterile air being maintained thereover at all times. The vessel was placed on a shaker and agitated in order to secure abundant aeration of the mash and incubated for 90 hours at 29° C. The results appearing below in tabular form show the number of μg. of riboflavin per ml. produced from peptone or egg albumen mashes in which the particular lipid indicated was incorporated.

Table

| Lipid source | Grams/ 100 cc. | Base medium | | Initial pH | Final pH |
|---|---|---|---|---|---|
| | | Peptone (2.4 grams/ 100 cc.) | Salts and egg albumen (0.6 grams/ 100 cc.) | | |
| | | μg./ml. | μg./ml. | | |
| Corn oil | 0.6 | | 178 | 6.5 | 7.1 |
| "Mazola" oil | 0.6 | | 113 | 6.5 | |
| Olive oil | 0.6 | 110 | | 6.5 | 7.1 |
| Peanut oil | 0.6 | | 107 | 6.5 | 6.7 |
| Cocoa butter | 0.6 | 134 | | 6.5 | 7.1 |

It is to be specifically understood, of course, that the above example is merely illustrative and is to be in no way considered limitative. For instance, although a relatively limited number of lipid-protein containing mashes have been disclosed in the above example, it should be understood that any mash containing a metabolizable lipid and having protein present in a concentration of about 10 to 90 per cent by weight of the nutrient contained therein, may be employed. If mashes, other than those of the type specifically mentioned are utilized, one skilled in the art may readily make the necessary adjustments to approximate the composition of the mashes described above. Also, it will be apparent to those skilled in the art that various modifications in temperature, and pH, as well as other factors may be introduced without departing from the scope of the present invention.

The invention having now been described, what I desire to claim is:

1. In a process for the production of riboflavin, the steps which comprise subjecting a substantially carbohydrate free nutrient mash containing as its two principal nutrients a metabolizable lipid and from between about 10 to 90 per cent of a proteinaceous material, based upon the weight of the total nutrients present in the mash, to the action of a culture of the fungus *Eremothecium ashbyii*, and maintaining the mash in a state of aeration sufficient to disperse the fungus and air throughout the mash.

2. In a process for the production of riboflavin, the steps which comprise subjecting a substantially carbohydrate free nutrient mash containing as its two principal nutrients a metabolizable lipid and from between about 10 to 90 per cent of a proteinaceous material, based on the weight of the total nutrients present in the mash, to the action of a culture of the fungus *Eremothecium ashbyii*, and maintaining the mash in a state of aeration sufficient to disperse the fungus and air throughout the mash.

3. In a process for the production of riboflavin, the steps which comprise subjecting a substantially carbohydrate free nutrient mash containing as its two principal nutrients a metabolizable lipid and from between about 10 to 90 per cent of a proteinaceous material, based on the weight of the total nutrients present in the mash, to the action of a culture of the fungus *Eremothecium ashbyii*, and maintaining the mash in a state of aeration and agitation by the combined action of mechanical agitation and a current of air.

4. In a process for the production of riboflavin, the steps which comprise subjecting a substantially carbohydrate free nutrient mash containing as its two principal nutrients a metabolizable lipid and from between about 10 to 90 per cent of a proteinaceous material, based on the weight of the total nutrients present in the mash, to the action of a culture of the fungus *Eremothecium ashbyii*, and introducing air into said mash at a rate of between about 1.5 to 2.0 cubic feet per minute, per square foot of mash surface.

5. In a process for the production of riboflavin, the steps which comprise subjecting a substantially carbohydrate free nutrient mash containing as its two principal nutrients a metabolizable lipid and from between about 10 to 90 per cent of a proteinaceous material, based on the weight of the total nutrients present in the mash, to the action of a culture of the fungus *Eremothecium ashbyii*, at a temperature of from 15 to 40° C., and maintaining said mash in a state of aeration sufficient to disperse the fungus and air throughout the mash.

6. In a process for the production of riboflavin, the steps which comprise subjecting a substantially carbohydrate free nutrient mash containing as its two principal nutrients a metabolizable lipid and from between about 10 to 90 per cent of a proteinaceous material, based on the weight of the total nutrients present in the mash, to the action of a culture of the fungus *Eremothecium ashbyii*, at a temperature of from 23 to 34° C., and maintaining said mash in a state of aeration sufficient to disperse the fungus and air throughout the mash.

7. In a process for the production of riboflavin, the steps which comprise adjusting the pH of a substantially carbohydrate free nutrient mash containing as its two principal nutrients a metabolizable lipid and from between about 10 to 90 per cent of a proteinaceous material, based on the weight of the total nutrients present in the mash, to a value of between about 4.5 and 9.1, subjecting said mash to the action of a culture of the fungus *Eremothecium ashbyii*, at a temperature of from 15 to 40° C., and maintaining said mash in a state of aeration sufficient to disperse said fungus and air throughout the mash.

8. In a process for the production of riboflavin, the steps which comprise adjusting the pH of a substantially carbohydrate free nutrient mash containing as its two principal nutrients a metabolizable lipid and from between about 10 to 90 per cent of a proteinaceous material, based on the weight of the total nutrients present in the mash, to a value of between about 4.5 and 9.1, subjecting said mash to the action of a culture of the fungus *Eremothecium ashbyii*, at a temperature of from 15 to 40° C., and aerating said mash at a rate of from 1.5 to 2.0 cubic feet per minute, per square foot of mash surface.

9. In a process for the production of riboflavin, the steps which comprise adjusting the pH of a substantially carbohydrate free nutrient mash containing as its two principal nutrients a metabolizable lipid and from between about 10 to 90 per cent of a proteinaceous material, based on the weight of the total nutrients present in the mash, to a value of between about 5.5 and 7.5, subjecting said mash to the action of a culture of the fungus *Eremothecium ashbyii*, at a temperature of from 23 to 34° C., and aerating said mash at a rate of from about 1.5 to 2.0 cubic feet per minute, per square foot of mash surface.

10. A process for the production of highly concentrated solutions of riboflavin, which comprises inoculating a substantially carbohydrate free nutrient mash containing as its two principal nutrients a metabolizable lipid and from between about 10 to 90 per cent of a proteinaceous material, based on the weight of the total nutrients present in the mash, with the fungus, *Eremothecium ashbyii*, and maintaining the fungus in substantially uniform dispersion throughout the mash and in intimate contact with air during the fermentation.

11. In a process for the production of riboflavin, the steps which comprise subjecting a substantially carbohydrate free nutrient mash containing as its two principal nutrients a metabolizable lipid and from between about 10 to 90 per cent of a proteinaceous material, based on the weight of the total nutrients present in the mash, to the action of a culture of the fungus *Eremothecium ashbyii*, maintaining the mash in a state of aeration sufficient to disperse the fungus and air throughout the mash, and heating the resulting fermented mash to release the synthesized riboflavin present in the cells of the fungus.

12. In a process for the production of riboflavin, the steps which comprise subjecting a substantially carbohydrate free nutrient mash containing as its two principal nutrients from between about 10 to 90 per cent of a proteinaceous material based upon the weight of the total nutrients present in the mash, and a metabolizable lipid, selected from the group consisting of corn oil, peanut oil, cocoa butter, and olive oil, to the action of a culture of the fungus *Eremothecium ashbyii*, and maintaining the mash in a state of aeration sufficient to disperse the fungus and air throughout the mash.

13. In a process for the production of riboflavin, the steps which comprise subjecting a substantially carbohydrate free nutrient mash containing as its two principal nutrients from between about 10 to 90 per cent of a proteinaceous material based upon the weight of the total nutrients present in the mash, and a metabolizable lipid, selected from the group consisting of corn oil, olive oil, peanut oil, and cocoa butter, to the action of a culture of the fungus *Eremothecium ashbyii*, at a temperature of from 15 to 40° C., and maintaining said mash in a state of aeration sufficient to disperse said fungus and air throughout the mash.

14. In a process for the production of riboflavin, the steps which comprise subjecting a substantially carbohydrate free nutrient mash containing as its two principal nutrients from between about 10 to 90 per cent of a proteinaceous material based upon the weight of the total nutrients present in the mash, and a metabolizable lipid, selected from the group consisting of corn oil, olive oil, peanut oil, and cocoa butter, to the action of a culture of the fungus *Eremothecium ashbyii*, at a temperature of from 23 to 34° C., and maintaining said mash in a state of aeration sufficient to disperse said fungus and air throughout the mash.

15. In a process for the production of riboflavin, the steps which comprise adjusting the pH of a substantially carbohydrate free nutrient mash to a value of between about 4.3 and 9.1, said mash containing as its two principal nutrients from between about 10 to 90 per cent of a proteinaceous material based upon the weight of the total nutrients present in the mash, and a metabolizable lipid selected from the group consisting of corn oil, olive oil, peanut oil and cocoa butter, subjecting said mash to the action of a culture of the fungus *Eremothecium ashbyii*, at a temperature of from 23 to 34° C., and aerating said mash at a rate from about 1.5 to 2.0 cubic feet per minute, per square foot of mash surface.

FRANK J. RUDERT.